United States Patent

LeVert et al.

[11] 4,091,288
[45] May 23, 1978

[54] THRESHOLD SELF-POWERED GAMMA DETECTOR FOR USE AS A MONITOR OF POWER IN A NUCLEAR REACTOR

[75] Inventors: Francis E. LeVert, Chicago; Samson A. Cox, Darien, both of Ill.

[73] Assignee: The United States of America as represented by the United States Department of Energy, Washington, D.C.

[21] Appl. No.: 784,402

[22] Filed: Apr. 4, 1977

[51] Int. Cl.² ............................................. G01T 1/22
[52] U.S. Cl. ................................................. 250/370
[58] Field of Search ................ 250/370, 390, 391, 392

[56] References Cited

U.S. PATENT DOCUMENTS

| | | | |
|---|---|---|---|
| 3,400,289 | 9/1968 | Anderson | 250/390 |
| 3,603,793 | 9/1971 | Warren | 250/392 |
| 3,940,627 | 2/1976 | Klar | 250/390 |

Primary Examiner—Alfred E. Smith
Assistant Examiner—Janice A. Howell
Attorney, Agent, or Firm—Dean E. Carlson; Frank H. Jackson; Donald P. Reynolds

[57] ABSTRACT

A self-powered gamma monitor for placement near the core of a nuclear reactor comprises a lead prism surrounded by a coaxial thin nickel sheet, the combination forming a collector. A coaxial polyethylene electron barrier encloses the collector and is separated from the nickel sheet by a vacuum region. The electron barrier is enclosed by a coaxial stainless steel emitter which, in turn, is enclosed within a lead casing. When the detector is placed in a flux of gamma rays, a measure of the current flow in an external circuit between emitter and collector provides a measure of the power level of the reactor.

6 Claims, 4 Drawing Figures

THRESHOLD SELF-POWERED GAMMA DETECTOR FOR USE AS A MONITOR OF POWER IN A NUCLEAR REACTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the measurement of power level in a nuclear reactor by measuring gamma radiation emanating from the core of the reactor.

When a nuclear reactor is operating, it is necessary to have a continuous indication of the power level of the reactor. Perhaps the most direct indication of this power level is the temperature within the reactor, but this has disadvantages as a control parameter because of the time delay associated with reactor temperature. Neutron flux is an informative parameter which is normally monitored. It would be useful to have alternative means of measuring the power level as a check on thermal monitors and neutron monitors and as a source of additional information. It would be particularly useful to have a self-powered detector that is operable directly on a measuring parameter other than neutron flux or temperature without the application of external power to make the measurement.

It is an object of the present invention to provide a monitor of the power level in a nuclear reactor.

It is a further object of the present invention to provide a monitor of the power level in a nuclear reactor by means of measuring the flux of high-energy gamma rays in the reactor.

It is a further object of the present invention to provide a self-powered gamma detector for placement near the core of a nuclear reactor.

Other objects will become apparent in the course of a detailed description of the invention.

SUMMARY OF THE INVENTION

A detector of the power level in a nuclear reactor through measurement of properties of gamma rays comprises a lead prism surrounded coaxially by a thin layer of nickel which, in turn, is surrounded coaxially by a vacuum region. A thin coaxial layer of polyethylene encloses the vacuum region which is enclosed by a coaxial stainless steel emitter. The assembly is completed by a coaxial layer of lead. When the assembly is placed in a flux of gamma rays, measurement of the current in an external circuit between the stainless steel and the lead provides a measure of the Compton electrons and photoelectrons produced primarily by high-energy gamma rays in the emitter and hence of the flux of gamma rays, which is proportional to the power level in the reactor.

DETAILED DESCRIPTION OF THE INVENTION

Figures 1, 2:
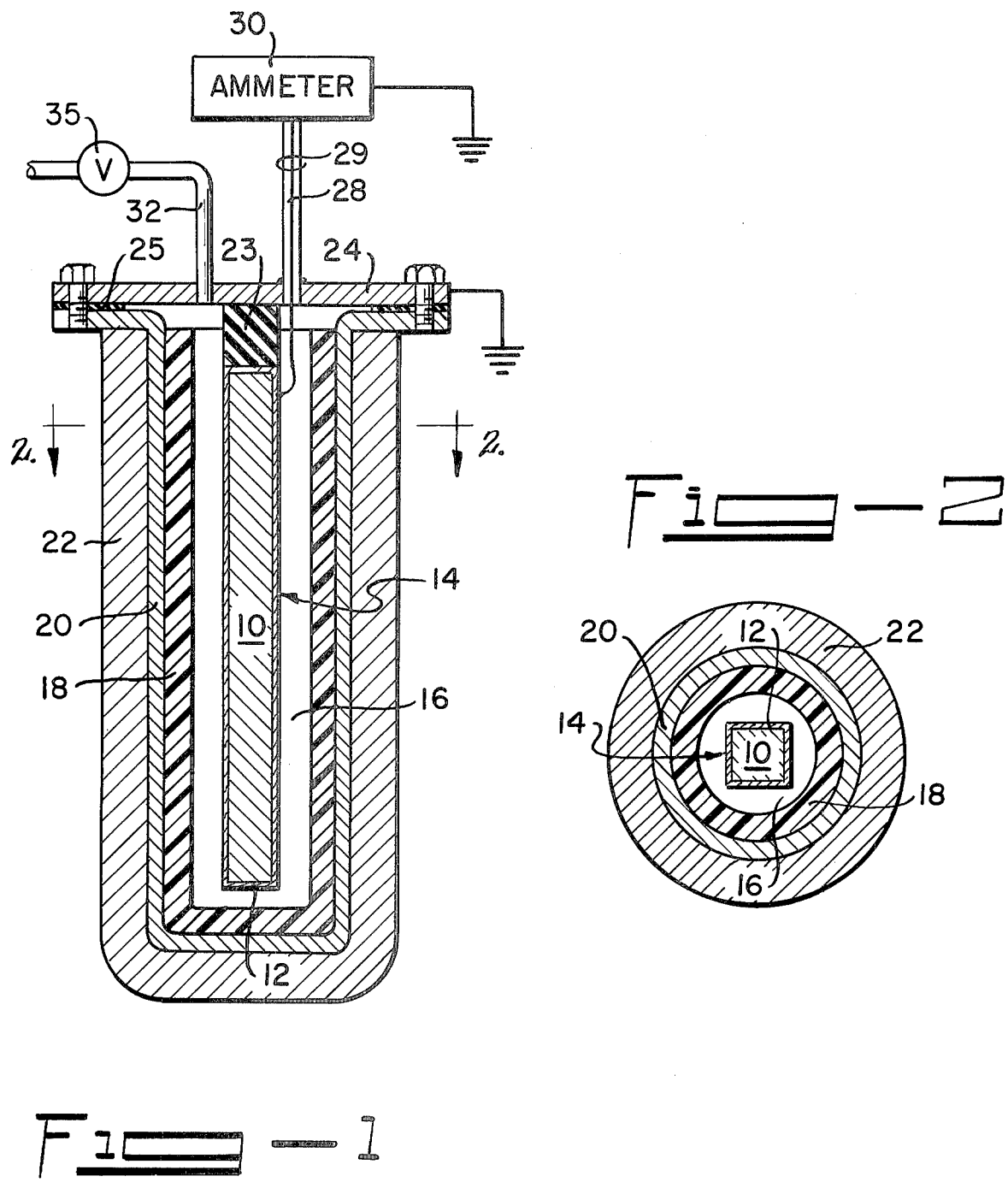
FIG. 1 is a partial sectional side view of the detector of the present invention.
FIG. 2 is a cross-sectional view of the detector of FIG. 1 taken along section lines 2—2.

FIG. 1 is a partial sectional side view of the detector of the present invention and FIG. 2 is a cross-sectional view of the detector along section lines 2—2 of FIG. 1. In FIGS. 1 and 2, prism 10 is a lead bar that is enclosed within nickel foil 12. Prism 10 is shown as a square prism because square lead bar stock, in this case 1.3 cm. on a side, was available and was easy to cover with 10-mil (¼ mm.) nickel foil. This shape, however, is arbitrary. Prism 10 could equally as well be round or any other shape that could be covered or plated with a comparable thickness of nickel to minimize emission of photoelectrons produced by back-scattered gamma rays in lead bar 10. In addition, prism 10 serves to attenuate gamma rays passing through it so as to reduce the production of Compton electrons at its surface. Alternatively, prism 10 could be a hollow cylinder of suitable electrically conducting material designed to minimize the production of Compton electrons or photoelectrons in the prism. Prism 10 and foil 12 comprise collector 14 which is separated by vacuum region 16 from electron barrier 18, a coaxially disposed structure of polyethylene 0.6 cm. in thickness. The electron barrier could equally as well be carbon of 0.3 cm in thickness, since either of these values will stop low-energy Compton electrons or photoelectrons. Electron barrier 18 is enclosed by emitter 20 which is a stainless steel tube 0.3 cm. in thickness touching electron barrier 18. Emitter 20 is enclosed within shield 22, a coaxial structure of lead 1.3 cm. in thickness that is closed at one end. Collector 14 is connected to insulator 23, and the structure is maintained in alignment by end cap 24 which supports insulator 23 and also provides a vacuum seal with gasket 25. Electrical lead 28 is connected to collector 14 and is brought out through end cap 24 as a center conductor of coaxial cable 29 to ammeter 30. A vacuum port 32 is provided in end cap 24 so that the detector can be either pumped continuously or else initially pumped down to a nominal vacuum of the order of one micron of mercury and sealed off by valve 35. Ammeter 30 is connected to lead 28 by a shielded coaxial cable 29 to measure the current flow between the emitter 20 and collector 14 when the detector is in a flux of gamma rays. Ammeter 30 is indicated schematically because the currents to be expected are of the order of picoamperes at reactor power levels up to about 10 kilowatts and ammeter 30 will therefore be an ordinary electronic circuit capable of measuring such currents.

The structure described above serves as a detector of the power level in a reactor by detecting high-energy gamma rays. It is necessary to eliminate low-energy gamma rays that result from the decay of fission products in order to discriminate in favor of gamma rays produced by prompt fission. Gamma rays incident upon the detector first pass through shield 22 which is made of lead that is selected to be thick enough to attenuate photons of gamma rays having energies less than 1.5 MeV. The emitter 20 generates primarily Compton electrons and a small component of photoelectrons in response to those gammas that have sufficiently high energy to pass through the shield 22. The electron barrier 18 is the primary control for the threshold characteristics of the detector in that it acts as a barrier to low-energy Compton and photoelectrons emitted from the stainless steel. Electrons that pass through the electron barrier 18 traverse the vacuum regions 16 and strike collector 14 where they are collected.

The dimensions mentioned above for the elements of the detector are in general functions of the particular reactor on which measurements are to be made and will vary in a manner that can be treated routinely by a reactor engineer for application to different nuclear reactors. Similarly, the materials of the detector were described specifically for a model that has been built and used. Other materials selected to meet the proper criteria would serve as well. All of the materials were chosen to exhibit small cross-sections for activation by thermal neutrons. The material of shield 22 need only shield against low-energy gamma rays. Emitter 20 should be selected to produce more Compton or photo-electrons for an incident gamma ray than any of the other materials of the detector so that emitter 20 is the primary emitter of the detector. Electron barrier 18 was made of polyethylene in the detectors that have been produced, but any material that would meet the requirements of having a low cross-section for activation and dimensions sufficient to stop the majority of low-energy electrons will serve. In particular, almost any organic solid that will withstand the intense neutron and gamma environment of a nuclear reactor would suffice.

Figure 3:
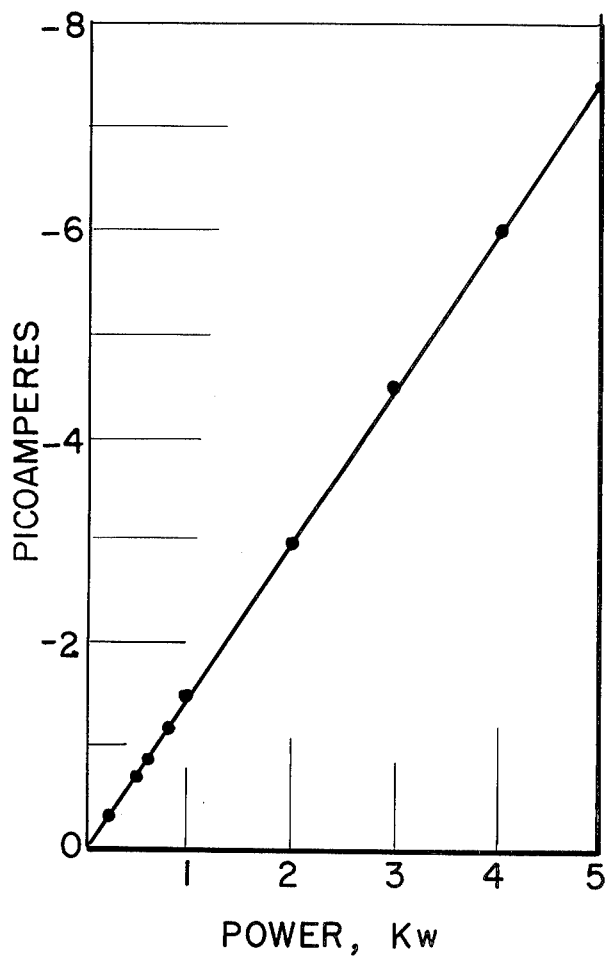
FIG. 3 is a plot of the output current of the detector as a function of reactor power.

The results of measurements on a detector such as that of FIGS. 1 and 2 in the Argonne Thermal Source Reactor (ATSR) are shown in FIG. 3 which is a plot of the current in picoamperes detected in the apparatus of FIG. 1 for various values of the power level of the ATSR as monitored by independent means. It can be seen from FIG. 3 that the current in the detector is a linear function of the reactor power over a range of powers extending from nearly 0 to 5 kilowatts.

Figure 4:
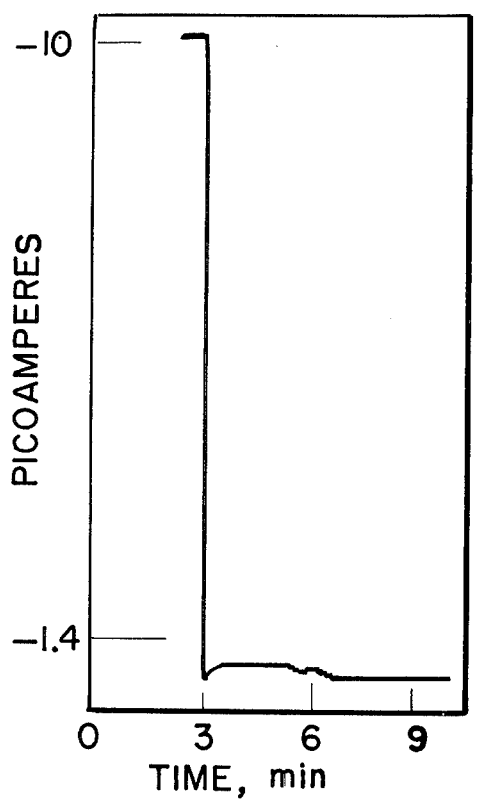
FIG. 4 is a plot of reactor power as a function of time after a scram shutdown.

The detector of the present invention is particularly useful for following the rapid changes in the power level. An example of such a change is FIG. 4 which is a plot of detector current, convertible through FIG. 3 to reactor power levels as a function of time during a reactor scram or sudden shutdown. The detector current in FIG. 4 is seen to drop at a rate that is essentially instantaneous on the time scale of FIG. 4.

The embodiments of the invention in which an exclusive property or privilege is claimed are defined as follows:

1. A detector of the power level in a nuclear reactor by measuring high-energy gamma rays, the detector comprising:

means for screening out low-energy gamma rays;

means for generating Compton and photoelectrons in response to high-energy gamma rays;

means for screening out low-energy Compton and photoelectrons produced in an emitter;

means for screening out low-energy photoelectrons produced by back-scattered gamma rays;

means for detecting Compton and photoelectrons produced by the high-energy gamma rays; and means for measuring current of the Compton and photoelectrons produced by high-energy gamma rays, which current is a measure of the flux of high-energy gamma rays and hence of the power level of the reactor.

2. An apparatus for measuring power level in a nuclear reactor by detecting gamma rays, the apparatus comprising:

a lead prism;

a nickel structure enclosing and touching the lead prism coaxially;

an insulator supporting the prism and the nickel structure;

a vacuum region surrounding the nickel structure coaxially;

a coaxial electron barrier surrounding the vacuum region, the electron barrier closed at an end;

a coaxial metal emitter surrounding and touching the electron barrier;

a coaxial lead shield surrounding and touching the emitter;

an end cap at an end of the structure disposed perpendicular to an axis of the structure and connected to the emitter, the electron barrier, and the insulator to maintain relative coaxial positions thereof and form a vacuum seal with the end cap and an electrical connection with the emitter and an electrical ground;

an electrical lead connected to the nickel structure and lead prism and extending to the end cap;

a coaxial cable having a center conductor connected to the electrical lead and having a shield connected to the end cap;

means connected to the vacuum region for establishing and maintaining a vacuum therein; and means connected to the center conductor and electrical ground for measuring electric current therebetween.

3. The apparatus of claim 2 wherein the electron barrier is polyethylene having a nominal thickness of 0.6 cm.

4. The apparatus of claim 2 wherein the electron barrier is carbon having a nominal thickness of 0.3 cm.

5. The apparatus of claim 2 wherein the emitter is stainless steel tubing having a nominal thickness of 0.3 cm.

6. The apparatus of claim 3 wherein the lead prism is a square prism having a cross-section 1.3 cm. on a side.

* * * * *